Oct. 26, 1926.
T. B. DRESCHER
1,604,152
APPARATUS FOR MARKING GLASS ARTICLES
Filed Feb. 27, 1922
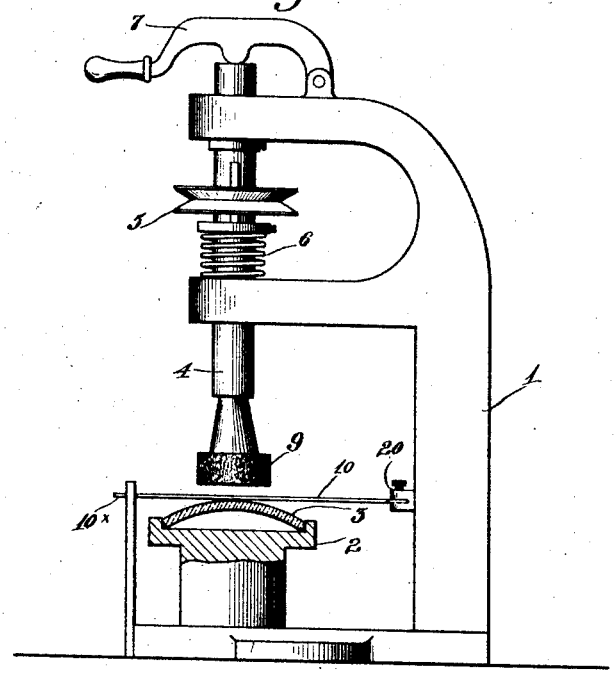
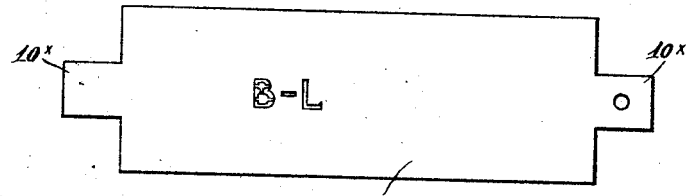
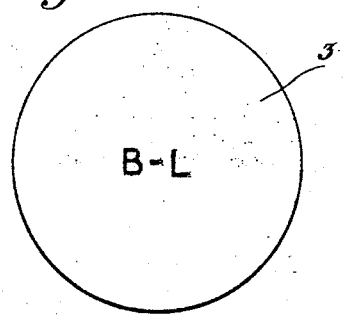
INVENTOR.
Theodore B. Drescher.
BY
His ATTORNEY.

Patented Oct. 26, 1926.

1,604,152

UNITED STATES PATENT OFFICE.

THEODORE B. DRESCHER, OF ROCHESTER, NEW YORK, ASSIGNOR TO BAUSCH & LOMB OPTICAL COMPANY, OF ROCHESTER, NEW YORK, A CORPORATION OF NEW YORK.

APPARATUS FOR MARKING GLASS ARTICLES.

Application filed February 27, 1922. Serial No. 539,428.

My present invention has for its object to provide an apparatus for placing designating or identifying marks upon glass articles, such as ophthalmic or other lenses whereby, although such markings are not visible under ordinary circumstances and do not interfere with the free and unobstructed passage of light, they can be readily identified when desired. This invention is particularly adapted for placing identifying marks upon ophthalmic lenses so that those of one manufacturer or dealer may not be readily substituted and sold as and for those of the manufacturer whose goods are called for by name or other designating means.

The identifying mark or design is formed upon the surface of the glass, by abrading its surface so slightly that said mark will become visible only upon the application of a finely divided material, such as by a thin film of condensed moisture formed by breathing upon it, but such mark will not under ordinary circumstances interfere with perfect vision or be seen by looking through the lens.

The preferred manner of carrying out this invention is to take a lens which has been ground and polished or otherwise finished in the usual manner and abrade a portion of the surface in the form of the designation or design required, by means of a very fine abradant such as rouge, or emery, this supplemental abrading or polishing operation being preferably formed through a mask or stencil plate of thin material, such as sheet steel, the solid portions of which protect the major portion of the glass surface while the openings permit the action of abradant carried by a soft felt pad rapidly rotated or otherwise moved over in contact with the upper surface of the protecting plate. This can be accomplished by a very fine stream of abrasive material such as a sand blast.

In the accompanying drawings, I have shown a sectional view of an apparatus for carrying out this invention, in which:

Figure 1 is a side elevation of a machine, and

Figure 2 a plan view of the stencil or protecting plate employed.

The frame 1 of the machine may be of any suitable or desired construction having at its lower portion a lens holder 2 in which the lens 3 is supported. 4 indicates a spindle or arbor arranged over the lens in suitable bearings provided in the frame, carrying a driving wheel 5 by means of which it is rotated, said spindle being capable of longitudinal movement in its bearings by any suitable means such as a lifting spring 6 and a depressing lever 7 pivoted to the frame and bearing upon its upper end. The lower end of the spindle carries a light felt buffing disk 9 adapted to carry on its lower surface rouge or other suitable fine abradant. 10 indicates a stencil or protecting plate of material which will readily conform to the surface of the article, such as spring steel, perforated to form the required designation, as for instance the letters "B-L," the ends of this stencil being supported by the main frame normally above the surface of the lens, but sufficiently close thereto so that when the buffing pad charged with rouge is depressed it will carry down the stencil and its under surface projecting through the aperture will cause the abradant to slightly abrade or additionally polish the surface of the lens at these parts only, the balance of the surface of the lens being protected by the plate itself which conforms more or less to its surface. One or both ends of the stencil or protecting plate may be allowed a slight movement in a slot formed in its support sufficient to permit it to readily conform to different curvatures of lenses if desired. The reduced end of the plate indicated by $10^x$ may, if desired, slide in its support while the other end is secured by suitable means, such as a clamp indicated by 20.

Instead of this form of support for the stencil, any other could be employed causing the relative movements of the parts to produce the effect.

It will be understood that the amount of abrasion to which the lens surface is subjected through the stencil is very slight, and not sufficient to interfere with the light transmitting properties of the lenses which can be used in ordinary spectacles or eyeglasses without being noticeable, but the markings are readily perceptible when the abraded surface and the adjoining parts are covered with a light coating of condensed vapor, formed for instance by breathing upon it.

The marking so applied to a lens may be applied for the purpose of readily identifying it by the indication of its refracting power, its axis, if a cylinder, its kind or its source of manufacture as by a trade-mark. The resiliency of the stencil permits it to rise above the surface of the lens when the pad is lifted and thus allows another lens to be substituted so that the operation of marking lenses may be accomplished very rapidly by simply placing them in their holders beneath the stencil and pad.

I claim as my invention:

1. An apparatus for marking lenses and similar glass articles comprising a support for the article, a polishing pad carrying an abradant, a thin yielding protecting member interposed between the article and pad having apertures therein forming a predetermined character, means for normally supporting the protecting member out of contact with both the article and the pad, and means for bringing the pad in contact first with the protecting member to move the same and then with the article through the apertures in the protecting member.

2. An apparatus for marking lenses and similar glass articles comprising a support for the article, a rotary polishing pad, a thin protecting stencil member having an aperture interposed between the pad and article, and means for relatively moving the lens, pad and stencil to cause portions of the article to be abraded through the apertures in the stencil, and means for automatically removing the stencil from the article when the pad is out of contact with the stencil.

3. An apparatus for marking lenses and similar articles comprising an article support, a rotary polishing pad, a thin flexible stencil arranged between the pad and article support, a relatively fixed support for the stencil and means for moving the pad and support relatively toward and from each other.

THEODORE B. DRESCHER.